Figure 1:
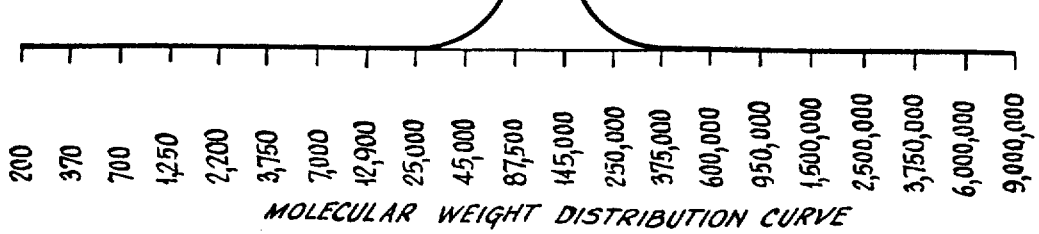

United States Patent [19]

Fechillas

[11] 3,901,843

[45] Aug. 26, 1975

[54] SYNTHETIC RESIN BINDER COMPOSITIONS FROM ACRYLIC ACID ESTERS

[75] Inventor: Michael R. Fechillas, New Brunswick, N.J.

[73] Assignee: Johnson & Johnson, New Brunswick, N.J.

[22] Filed: Mar. 11, 1974

[21] Appl. No.: 450,140

Related U.S. Application Data

[62] Division of Ser. No. 311,036, Nov. 30, 1972, Pat. No. 3,836,514, and Ser. No. 195,373, Nov. 3, 1971, Pat. No. 3,732,139.

[52] U.S. Cl. .............. 260/29.6 TA; 117/161 UZ; 117/161 UT; 161/170; 260/29.6 R; 260/29.6 H; 260/29.6 RB; 260/29.6 RW; 260/29.6 TA; 260/29.6 T

[51] Int. Cl. ...................... C08f 45/24; C08f 29/46

[58] Field of Search .......... 260/29.6 RB; 29.6 RW; 260/29.6 TA, 29.6 T

[56] References Cited

UNITED STATES PATENTS

| | | | |
|---|---|---|---|
| 3,376,276 | 4/1968 | Stroh | 260/85.5 S |
| 3,468,976 | 9/1969 | Yanai et al. | 260/883 |
| 3,801,675 | 4/1974 | Russell | 260/901 |
| 3,812,205 | 5/1974 | Dunkelberger | 260/885 |
| 3,836,514 | 9/1974 | Fechillas | 260/86.1 E |

*Primary Examiner*—Lucille M. Phynes

[57] ABSTRACT

Synthetic resin binder compositions which comprise from about 10 to about 50 percent by weight of a polymodal molecular weight distribution synthetic acrylic ester resin in which (1) one mode or peak is present in the molecular weight range of from about 300 to about 2000 and another mode or peak is present in the molecular weight range of from about 4000 to about 600,000 and (2) from about 10 to about 40 percent by weight has a molecular weight in the range of from about 300 to about 2000 and from about 90 to about 60 percent by weight has a molecular weight in the range of from about 4000 to about 600,000 said polymodal molecular weight distribution synthetic acrylic ester resin having a swell index in tetrahydrofuran of from about 50 to about 200, from about 50 to about 90 percent by weight of insolubles in tetrahydrofuran, and a second order glass transition temperature of from about −40°C. to about +5°C.

7 Claims, 3 Drawing Figures

MOLECULAR WEIGHT DISTRIBUTION CURVE

MOLECULAR WEIGHT DISTRIBUTION CURVE

MOLECULAR WEIGHT DISTRIBUTION CURVE

SYNTHETIC RESIN BINDER COMPOSITIONS FROM ACRYLIC ACID ESTERS

This patent application is a division of copending patent application Ser. No. 311,036 which was filed on Nov. 30, 1972, now U.S. Pat. No. 3,836,514 (granted Sept. 17, 1974) and application Ser. No. 195,373, filed Nov. 3, 1971, now U.S. Pat. No. 3,732,139 which issued May 8, 1973.

BACKGROUND OF THE INVENTION

The present invention relates to porous, absorbent, fibrous sheet materials and to their methods for manufacture. More particularly, the present invention is concerned with the so-called bonded, "nonwoven" textile fabrics, i.e., fabrics produced from textile fibers without the use of conventional spinning, weaving, knitting, or felting operations.

THE NONWOVEN FABRICS

Although not limited thereto, the invention is of primary importance in connection with nonwoven fabrics derived from "oriented" or carded fibrous webs composed of textile-length fibers, the major proportion of which are oriented predominantly in one direction. Typical of such fabrics are the so-called "MASSLINN" nonwoven fabrics, some of which are described in greater particularity in U.S. Pat. Nos. 2,705,687 and 2,705,688, issued Apr. 5, 1955 to D. R. Petterson et al., and I. S. Ness et al., respectively.

Another aspect of the present invention is its application to nonwoven fabrics wherein the textile-length fibers were originally predominantly oriented in one direction but have been reorganized and rearranged in predetermined designs and patterns of fabric openings and fiber bundles. Typical of such latter fabrics are the so-called "KEYBAK" bundled nonwoven fabrics some of which are described in greater particularlity in U.S. Pat. Nos. 2,862,251 and 3,033,721, issued Dec. 2, 1958 and May 8, 1962, respectively, to F. Kalwaites.

Still another aspect of the present invention is its application to nonwoven fabrics wherein the textile-length fibers are disposed at random by air-laying techniques and are not predominantly oriented in one direction. Typical nonwoven fabrics made my such procedures are termed "isotropic" nonwoven fabrics and are described in greater particularity, for example, in U.S. Pat. Nos. 2,675,363 and 2,676,364, issued Apr. 27, 1964 to C. H. Plummer et al.

And, still another aspect of the present invention is its application to nonwoven fabrics which comprise textile-length fibers and which are made basically by conventional or modified aqueous papermaking techniques such as are described in greater particularity in pending patent application Ser. No. 4,405, filed Jan. 20, 1970 by P. R. Glor and A. H. Drelich. Such fabrics are also basically "isotropic" and generally have like properties in all directions.

The conventional base starting material for the majority of these nonwoven fabrics is usually a fibrous web comprising any of the common textile-length fibers, or mixtures thereof, the fibers varying in average length from approximately ½ inch to about 2½ inches. Exemplary of such fibers are the natural fibers such as cotton and the synthetic or man-made cellulosic fibers, notably rayon or regenerated cellulose.

Other textile-length fibers of a synthetic or manmade origin may be used in various proportions to replace either partially or perhaps even entirely the previously named fibers. Such other fibers include: polyamide fibers such as nylon 6, nylon 66, nylon 610, etc.; polyester fibers such as "Dacron," "Fortrel" and "Kodel"; acrylic fibers such as "Acrilan," "Orlon" and "Creslan"; modacrylic fibers such as "Verel" and "Dynel"; polyolefinic fibers derived from polyethylene and polypropylene; cellulose ester fibers such as "Arnel" and "Acele"; polyvinyl alcohol fibers; etc.

These textile-length fibers may be replaced either partially or entirely by fibers having an average length of less than about one-half inch and down to about one-quarter inch. These fibers, or mixtures thereof, are customarily processed through any suitable textile machinery (e.g., a conventional cotton card, a "Rando-Webber," a papermaking machine, or other fibrous web producing apparatus) to form a web or sheet of loosely associated fibers weighing from about 100 grains to about 2,000 grains per square yard or even higher.

If desired, even shorter fibers, such as wood pulp fibers or cotton linters, may be used in varying proportions, even up to 100 percent where such shorter length fibers can be handled and processed by the available apparatus. Such shorter fibers have lengths less than one-fourth inch, down to one one-eighth inch or less, for fluid pressures.

THE BONDING METHODS

The resulting fibrous web or sheet, regardless of its method of production, is then normally subjected to at least one of several types of bonding operations to anchor the individual fibers together to form a self-sustaining web. One method is to impregnate the fibrous web over its entire surface areas with various well-known bonding agents, such as natural or synthetic resins. Such over-all impregnation produces a nonwoven fabric of good longitudinal and cross-strength, acceptable durability and washability, and satisfactory abrasion resistance. However, the nonwoven fabric sometimes does not completely possess the softness, drape and hand of a woven or knitted textile fabric. Consequently, although such over-all impregnated nonwoven fabrics are satisfactory for many uses, they are still unsatisfactory in some instances as general purpose textile fabrics.

Another well-known bonding method is to print the fibrous webs with intermittent or continuous straight or wavy lines, or discrete areas of binder extending generally transversely or diagonally across the web and additionally, if desired, along the fibrous web. The resulting nonwoven fabric, as exemplified by a product disclosed in the Goldman U.S. Pat. No. 2,039,312 and sold under the Trademark, "MASSLINN" is more satisfactory as a textile fabric than over-all impregnated webs in that the softness, drape and hand of the resulting nonwoven fabric more nearly approach those of a woven or knitted textile fabric.

As stated previously, the properties of longitudinal and cross strength, durability, washability, abrasion resistance, softness, drape and hand are important and critical in nonwoven fabrics. However, there is still another property which is also important and critical, particularly in those uses wherein the nonwoven fabric is to be folded and/or tucked and wherein the fold and/or tuck is to be maintained without any appreciable resilient "spring-back" or undesirable opening-up of the folded and/or tucked nonwoven fabric.

This property of being tucked and folded in position s desirable in many nonwoven fabric products, not only during the manufacturing, processing, handling and packaging of the product but also in its subsequent ise. One prime example of such a product requiring good tuck and fold properties is a sanitary napkin wherein the tabs of the nonwoven fabric cover extending from each end are tucked together and folded inwardly during manufacturing and packaging and must be subsequently unfolded outwardly but remain in ucked position to facilitate fastening of the tabs to a anitary belt during use.

THE INVENTIVE CONCEPT

It has been discovered that the above-described roperties, and particularly the fabric strength and the ick and fold characteristics, are functions of the molecular weight distribution of the resin binder used. For xample, polymers having high average molecular 'eight distribution tend to be strong, although they lso tend to have poor tuck and fold characteristics. lso, polymers having low average molecular weight istribution tend to have good tuck and fold characteristics, although they tend to be lacking in strength.

It has further been discovered that the aboveescribed properties, and particularly the fabric rength and the tuck and fold characteristics can be btained by using a synthetic resin binder composition omprising from about 10 to about 50 percent by eight of a polymodal molecular weight distribution nthetic acrylic ester resin in which (1) one mode is esent in the molecular weight range of from about )0 to about 2,000 and another mode is present in the olecular weight range of from about 4,000 to about )0,000 and (2) from about 10 to about 40 percent by eight has a molecular weight in the range of from out 300 to about 2,000 and from about 90 to about ) percent by weight has a molecular weight in the nge of from about 4,000 to about 600,000, said olymodal molecular weight distribution synthetic rylic ester resin having a swell index in tetrahydroran of from about 50 to about 200, from about 50 to out 90 percent by weight of insolubles in tetrahydroran, and a second order glass transition temperature from about −40°C to about +5°C.

THE "POLYMODAL" CONCEPT

It is believed that the term "polymodal" should be fined more specifically in order to avoid any confun as to its meaning and scope. In statistical analysis, particular item in a series of statistical data which curs oftenest is called the mode. If one were to draw raph showing the molecular weight distribution of a ical conventional polymer of resin, the result would rmally be the well-known bell-shaped curve of nor.l distribution. The highest point, or mode, of this l-shaped curve indicates the particular molecular ight which occurs oftenest in the resin. Usually, only  highest point or mode occurs and hence such a l-shaped normal distribution curve is called nomodal. As will be described in detail hereinafter, h as monomodal curve is noted in FIG. 1 of the wings.

ly special techniques well known in the polymeriza1 art, it is possible for a curve of the molecular weight distribution of a polymer or resin to rise to a peak at a particular molecular weight and then recede and then rise again to a second peak at a subsequent different molecular weight. It is also possible for the graph to recede and rise still again to show a third peak, and so on. Such resins having two, three, or more modes or peaks are described herein as bimodal, trimodal, etc. or generically as "polymodal," meaning that the curve representing their molecular weight distribution will show two, three or more modes or peaks.

Such polymodal characteristics can be built into polymers or resins and specifically into synthetic acrylic acid ester resins in several ways. For example, one way is to add a limited amount of a chain transfer agent, such as lauryl mercaptan, at a specific point in time during the polymerization reaction. Lower molecular weight distributional modes are obtained by such techniques. Or, one can selectively graft additional polymer blocks on existing polymer chains by a post polymerization reaction by adding a limited amount of another polymer and a free radical initiator such as an organic peroxide. Such graft polymerization will lead to higher molecular weight distributional modes.

THE RESINS USED

Specific examples of such synthetic acrylic ester resins which lend themselves to such techniques include the polymerized alkyl esters of acrylic acid such as ethyl acrylate, ethyl-hexyl acrylate, methyl acrylate, propyl acrylate, butyl acrylate, etc. Other acrylates, such as hydroxyethyl acrylate, dimethyl amino ethyl acrylate, etc., are also of use. These synthetic acrylic ester resins may be used as homopolymers derived from one monomer, or may be used as copolymers or terpolymers of two or three monomers in various combinations, such as a copolymer of ethyl acrylate and butyl acrylate, or as a terpolymer of ethyl acrylate, butyl acrylate, and ethyl hexyl acrylate. Various mixtures in various proportions of these synthetic acrylic ester resins are also of use within the scope of the present inventive concept.

Regardless of the specific acrylate or mixture of acrylates which are used, it is essential that they be polymodal insofar as their molecular weight distribution is concerned.

THE DRAWINGS

Figure 2:
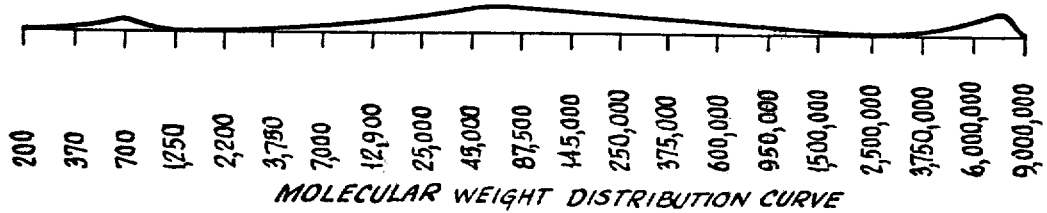
Figure 3:
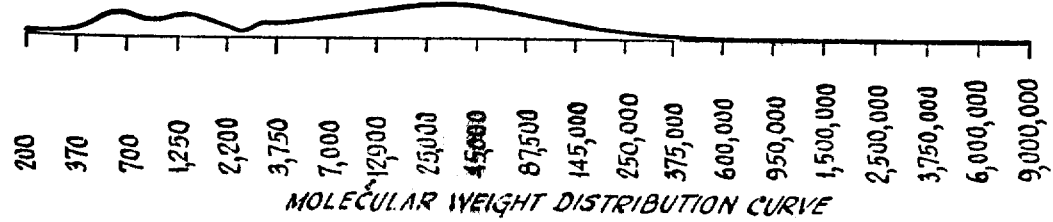

This aspect of the invention concept will be described and illustrated by reference to the attached drawings wherein:

FIG. 1 is a molecular weight distribution curve of a typical prior art synthetic resin showing a substantially symmetrical bell curve of normal distribution with an average molecular weight of about 120,000. This is a monomodal curve;

FIG. 2 is a molecular weight distribution curve of a polymodal synthetic acrylic ester resin, showing one mode or peak at a molecular weight of about 710, another mode or peak at a molecular weight of about 62,000 and a third mode or peak at a molecular weight of about 8 million; and FIG. 3 is a molecular weight distribution curve of another polymodal synthetic acrylic ester resin, showing one mode or peak at a molecular weight of about 620 and another mode or peak at a molecular weight of about 30,000.

With reference to the molecular weight distribution curves shown in the drawings, they are obtained by analysis on a Gel Permeation Chromatographic Analysis Machine equipped with 4 linear $7 \times 10^6$, $3 \times 10^6$, $10^5$, and $10^3$ A "Styragel" columns. The solvent is tetrahydrofuran which is maintained at a flow rate of 1 ml per minute at 25°C. The sample concentration is one-half percent. The sample load of 20 milligrams (1 weight/volume percent) is placed on the head of the column blank. The injection timing is 120 seconds. The sensitivity is 2X.

PRIOR ART BINDERS

Use of a synthetic resin such as illustrated in FIG. 1 having an average molecular weight of about 120,000 and possessing only one mode or peak will not yield a satisfactory resin binder.

If, by means of suitable and sufficient amounts of inhibitors during the polymerization reaction, the average molecular weight were to be shifted to the left in FIG. 1 to a lower single mode or peak value between 300 and 4,000, for example, and the substantially symmetrical curve of molecular weight distribution maintained, the result again would be an unsatisfactory resin binder. In such a case, the resulting resin binder would almost certainly not have sufficient strength and would almost surely be too tacky and too sticky.

And if, by means of suitable and sufficient amounts of inhibitors during the polymerization reaction, the average molecular weight were to be shifted to the right to FIG. 1 to a higher single mode or peak value between 400,000 and 8 million for example, and the substantially symmetrical curve of molecular weight distribution maintained, the result again would be an unsatisfactory resin binder. In such a case, the resulting resin binder may have sufficient strength but it would not have sufficient fold and tack properties.

THE INVENTION BINDERS

It is only when the proper amounts of suitable inhibitors or chain transfer agents are employed, or when suitable graft polymerization techniques are used, at the correct time during a polymerization reaction as to bring about a resin having a polymodal molecular weight distribution as described herein that satisfactory synthetic resin binders are obtained.

It has been established that optimum values are obtained only when from about 10 percent by weight to about 40 percent by weight of the synthetic resins is in the lower molecular weight range of from about 300 to about 2,000 and from about 90 percent by weight to about 60 percent by weight of the synthetic resins is in the higher molecular weight range of from about 4,000 to about 600,000 or more.

It has also been established that, even though the molecular weight distribution falls within the desired polymodal molecular weight ranges, it is also essential that the synthetic resin be cross-linked to within certain desired limits. Failure to cross-link the synthetic resin sufficiently will lead to an undesirably overly tacky and sticky synthetic resin. On the other hand, cross-linking to too great an extent will lead to a synthetic resin which is undesirably insufficiently tacky.

The extent of cross-linking can be established by determining (1) the swell index and (2) the percent insolubles of the synthetic resin.

In the present case, the swell index is determined by casting a film of the synthetic resin and immersing the cast film in a "solvent" or swelling agent for the non-cross-linked synthetic resin and observing the absorption of the solvent by the film and the extent of the swelling. In the present case, the solvent or swelling agent which is used is tetrahydrofuran. When the cross-linked synthetic resin is immersed in the solvent, which, in the absence of cross-linkages, would actually be a solvent for the resin, the synthetic resin film swells to many times its original volume by absorbing the solvent in which it is immersed. The swelling is greater the fewer the cross-linkages and the better the solvent. The swell index is determined by determining the weight of the film before immersion and after immersion. The increase in weight is, of course, the weight of the solvent absorbed by the film. The swell index is the ratio of the weight of the film after immersion to the weight before immersion.

In the present case, a swell index of from about 50 to about 200 has been found to be acceptable. A preferred range of the swell index extends from about 60 to about 180.

With regard to the determination of the percent insolubles in the synthetic resin, it is to be noted that such determination will not only indicate the extent of the cross-linking but also will correlate to the molecular weight of the synthetic resin. This is explained by the fact that the greater the cross-linking, the higher the molecular weight will become because of the linking together of more and more chains or "mers" of the synthetic resin.

The solvent used for the extraction of the insolubles in the synthetic resin is tetrahydrofuran and it has been established that a range of from about 50 to about 90 percent by weight of insolubles is acceptable. A preferred range for the percent insolubles extends from about 80 to about 90 percent. Naturally, more highly cross-linked and higher molecular weight synthetic resins will yield higher percent insolubles. And, lower cross-linked and lower molecular weight synthetic resins will yield lower percent insolubles.

Too high a percent insolubles will indicate an undesirably insufficiently tacky or sticky synthetic resin. Too low a percent insolubles will indicate an undesirably overly tacky and sticky synthetic resin.

Another factor to be considered in the determination of acceptable synthetic acrylic acid ester resins is the second order glass transition temperature (symbol $T_2$) which is used to distinguish a thermodynamic transition at which there occurs a relatively sharp change in the derivative of an extensive property of the synthetic resin, such as volume or heat content, from a first-order phase transition such as crystallization at which there is a sharp change in the extensive property itself.

Within the scope of the present inventive concept, it has been established that a second order glass transition temperature range of from about −40°C to about +5°C is most desirable and advantageous in order to obtain the necessary balance of properties with particular emphasis on the fold and tack property.

PREFERRED EMBODIMENTS

The invention will be further described by reference to the following examples wherein there are disclosed preferred embodiments of the present invention. However, it is to be appreciated that such Examples are illustrative but not limitative of the broader aspects of the inventive concept.

EXAMPLE I

A fibrous card web weighing about 214 grains per square yard and comprising 100 percent extra dull bleached rayon fibers, 3 denier and 1 9/16 inches in length, is intermittently bonded by the rotogravure process using an engraved binder printing roll having 4 horizontal wavy lines per inch, as measured in the machine or long direction. The width of each line as measured peripherally on the engraved binder printing roll is 0.019 inch.

The binder resin in an N-methylol acrylamide crosslinked copolymer of ethyl acrylate and butyl acrylate and the polymodal molecular weight distribution curve is shown in FIG. 2 of the drawings. The swell index of the resin in tetrahydrofuran is 177.2. The percent by weight of insolubles of the resin in tetrahydrofuran is 88.6 percent. The second order glass transition temperature is −15°C.

The aqueous binder composition comprises 9 pounds of a 50 percent solids aqueous dispersion of the binder resin, (real weight of resin 4.5 pounds), 1.4 pounds of a conventional thickening agent, 0.05 pounds of a conventional antifoam agent, and small amounts of conventional pigments, anti-oxidants, etc. The binder is applied to the wet web and drying takes place on heated drying cans at a temperature of about 270°F. The finished dry weight of the bonded nonwoven fabric is about 260 grains per square yard.

The properties of the bonded nonwoven fabric are:

| | | |
|---|---|---|
| Dry Cross Tensile | 6.9 | pounds |
| Wet Cross Tensile | 3.2 | pounds |
| Dry Long Tensile | 45.5 | pounds |
| Wet Long Tensile | 19.8 | pounds |
| Pinning Strength | 3.07 | pounds |
| Handle-o-Meter Softness | 84.4 | |
| Tab Retention | 22.1 | grams |

The bonded nonwoven fabric is excellent for use as a cover or wrapper for a sanitary napkin.

The bonded nonwoven fabric cover wraps very easily around the absorbent core of the sanitary napkin and the extending ends are easily tucked into the desired configuration. The tucked ends are then folded inwardly and remain in folded condition saitsfactorily during processing, handling and packaging. Subsequently, when the folded ends are unfolded for use, the tucks therein do not open up and securing of the ends to a sanitary belt is rendered very simple.

EXAMPLE II

A fibrous card web weighing about 210 grains per square yard and comprising 100 percent extra dull bleached rayon fibers, 3 denier and 1 9/16 inches in length, is intermittently bonded by the rotogravure process using an engraved roll having four horizontal wavy lines per inch, as measured in the machine or long direction. The width of each line as measured peripherally on the engraved roll is 0.019 inch.

The binder resin is an N-methylol acrylamide crosslinked copolymer of ethyl acrylate, butyl acrylate, and ethylhexyl acrylate and the polymodal molecular weight distribution curve is shown in FIG. 3 of the drawings. The swell index of the resin in tetrahydrofuran is 60.77. The percent by weight of insolubles of the resin in tetrahydrofuran is 54.3 percent. The second order glass transition temperature is −18°C.

The aqueous binder composition comprises 10 pounds of a 46.5 percent solids aqueous dispersion of the binder resin, (real weight of resin is 4.65 pounds) 1.4 pounds of a conventional thickening agent, 0.05 pounds of a conventional antifoam agent, and small amounts of conventional pigments, antioxidants, etc. The binder is applied to the wet web and drying takes place on heated drying cans at a temperature of about 270°F. The finished dry weight of the bonded nonwoven fabric is about 260 grams per square yard.

The properties of the bonded nonwoven fabric are:

| | | |
|---|---|---|
| Dry Cross Tensile | 3.4 | pounds |
| Wet Cross Tensile | 2.2 | pounds |
| Dry Long Tensile | 37.3 | pounds |
| Wet Long Tensile | 20.2 | pounds |
| Pinning Strength | 2.87 | pounds |
| Handle-o-Meter Softness | 90 | |
| Tab Retention | 25 | grams |

The bonded nonwoven fabric is excellent for use as a cover or wrapper for a sanitary napkin.

The bonded nonwoven fabric cover wraps very easily around the absorbent core of the sanitary napkin and the extending ends are easily tucked into the desired configuration. The tucked ends are then folded inwardly and remain in folded condition satisfactorily during processing, handling and packaging. Subsequently, when the folded ends are unfolded for use, the tucks therein do not open up and securing of the ends to a sanitary belt is rendered very simple.

In these Examples, reference has been made to Tab Retention values measured in grams. These values are relative, rather than absolute, and represent the result of considerable empirical testing data derived as follows:

Porous, absorbent, fibrous nonwoven fabrics having a weight of from about 240 grains per square yard to about 280 grains per square yard is bonded with a resin in the manner described in the preceding Examples. The fabric is then folded and tucked in very much the same way that the tabs on the ends of sanitary napkins are folded and tucked during commercial manufacture. See U.S. Pat. Nos. 2,918,065, 3,076,459, and 3,076,460 for typical folding and tucking procedures. The folded and tucked ends are then passed through cold (room temperature) pressure-applying rolls which press the ends together with approximately the same pressure as is applied during the conventional commercial handling and processing of the product. An Instron Tensile Testing Machine is then used in conventional manner to determine the force in grams required to separate or unfold the ends. This is very similar to a standard Peel Adhesion Test. Test values less than about 4 grams show low adhesivity and are undesirable inasmuch as the ends would undesirably unfold and open up subsequently during commercial handling and processing. Packaging problems would also be introduced. Values in excess of about 30 grams show adhesivity which is too great and are also undesirable as the ends are too tightly adhered and the surfaces therefore are sticky and tacky which could lead to an undesirable "blocking" or adhering to adjacent products.

Values between 20 and 25 are deemed most desirable and are preferred.

Having now described the invention in specific detail and exemplified the manner in which it may be carried into practice, it will be readily apparent to those skilled in the art that innumerable variations, applications, modifications, and extensions of the basic principles involved may be made without departing from its spirit and scope.

What is claimed is:

1. An aqueous synthetic resin binder composition for bonding porous, absorbent, fibrous, nonwoven fabrics comprising from about 10 percent to about 50 percent by weight of a polymodal synthetic acrylic acid ester resin in which from about 10 percent to about 40 percent by weight has a molecular weight in the range of from about 300 to about 2,000 and in which from about 90 percent to about 60 percent by weight has a molecular weight in the range of from about 4,000 to about 600,000 said polymodal synthetic acrylic acid ester resin having a swell index in tetrahydrofuran of from about 50 to about 200 and containing from about 50 percent to about 90 percent by weight of insolubles in tetrahydrofuran.

2. An aqueous synthetic resin binder composition as defined in claim 1, wherein said polymodal synthetic acrylic acid ester resin has a second order glass transition temperature of from about −40°C to about +5°C.

3. An aqueous synthetic resin binder composition as defined in claim 1, wherein said polymodal synthetic acrylic acid ester resin is a cross-linked copolymer of ethyl acrylate and butyl acrylate.

4. An aqueous synthetic resin binder composition as defined in claim 1, wherein said polymodal synthetic acrylic acid ester resin is an N-methylol acrylamide cross-linked copolymer of ethyl acrylate and butyl acrylate.

5. An aqueous synthetic resin binder composition as defined in claim 1, wherein said polymodal synthetic acrylic acid ester resin is a cross-linked copolymer of ethyl acrylate, butyl acrylate, and ethyl hexyl acrylate.

6. An aqueous synthetic resin binder composition as defined in claim 1, wherein said polymodal synthetic acrylic acid ester resin is an N-methylol acrylamide cross-linked copolymer of ethyl acrylate, butyl acrylate, and ethyl hexyl acrylate.

7. An aqueous synthetic resin binder composition as defined in claim 1, wherein said polymodal synthetic acrylic acid ester resin is cross-linked polyethyl acrylate.

* * * * *

UNITED STATES PATENT AND TRADEMARK OFFICE
CERTIFICATE OF CORRECTION

PATENT NO. : 3,901,843
DATED : August 26, 1975
INVENTOR(S) : Fechillas, Michael R.

It is certified that error appears in the above-identified patent and that said Letters Patent are hereby corrected as shown below:

In Column 2, line 28, delete the word "one" ---.

In Column 2, line 29, the word "pressures" should read "processes" ---.

In Column 3, line 64, the word "as" should read "a" ---.

In Column 5, line 5, after $10^3$, the letter "A" should read "A°" ---.

Signed and Sealed this fourth Day of May 1976

[SEAL]

Attest:

RUTH C. MASON
Attesting Officer

C. MARSHALL DANN
Commissioner of Patents and Trademarks